Feb. 18, 1969  R. L. SHALLENBERG  3,427,696

MACHINE TOOL TABLE LOCKING MECHANISM

Filed Nov. 21, 1966

INVENTOR
ROBERT L. SHALLENBERG
BY Bair, Freeman & Molinare
ATTORNEYS.

3,427,696
MACHINE TOOL TABLE LOCKING MECHANISM
Robert L. Shallenberg, Wheaton, Ill., assignor to K-Line
Corporation, Geneva, Ill., a corporation of Illinois
Filed Nov. 21, 1966, Ser. No. 595,686
U.S. Cl. 29—1                                3 Claims
Int. Cl. B23d 7/08

ABSTRACT OF THE DISCLOSURE

Locking mechanism for a machine tool table wherein a base for supporting a machine tool or a vise or the like has a lower surface rotatable on the upper surface of the tool table. A cylinder projects downwardly from the base, is rotatable in an opening of the table and has an outwardly projecting flange between which, and the lower surface of the table a locking wedge is operable to both lock the flange and cylinder and thereby the base against rotation relative to the table and draw the bottom surface of the base into contact with the top surface of the table. To insure contact between the two surfaces, two or more of the locking wedges may be provided.

---

One object of the invention is to provide locking means which through wedging action not only locks a cylindrical rotatable part of a machine tool base against rotation from a desired adjusted position, but also effects a downward force component which draws the bottom surface of the machine tool base into intimate contact with the top surface of the table.

Another object is to provide locking mechanism of this character in which a cylindrical portion projecting downwardly from a machine tool base rotates in an opening of a supporting table and terminates in a flange having a cone-shaped upper surface with which locking elements may engage and wedge between the bottom of the table and the cone-shaped surface of the flange.

Still another object is to provide means for supporting the locking elements and adjusting them comprising threaded rods which are screw-threaded through sides of the supporting table and swively support the wedges or locking elements, the outer ends of the threaded rods being provided with hand grip means for tightening and loosening the locking elements as desired.

With these and other objects in view, my invention consists in the construction, arrangement and combination of the various parts of my machine tool table locking mechanism, whereby the objects above contemplated are attained, as hereinafter more fully set forth, pointed out in my claims and illustrated in detail on the accompanying drawing, wherein:

Figure 1:
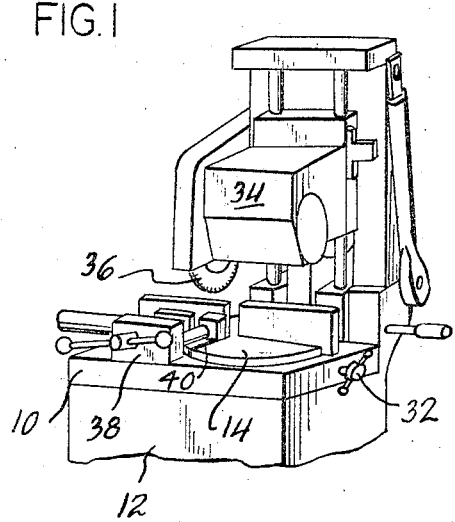
FIG. 1 is a perspective view of the machine tool of the general type to which my locking mechanism may be applied.
Figure 2:
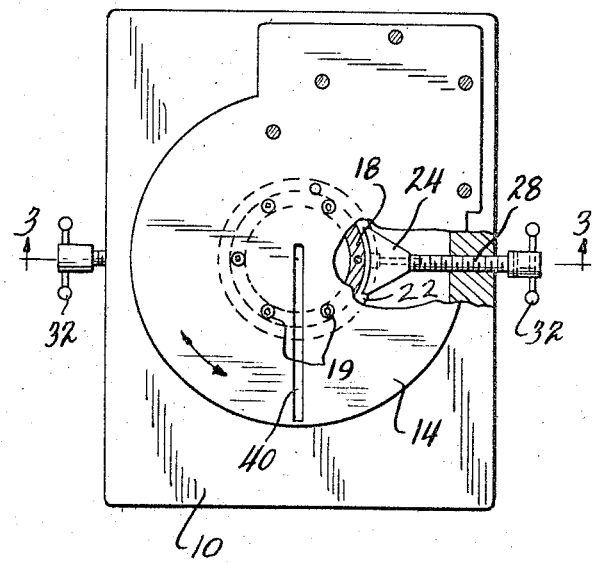
FIG. 2 is a plan view of a supporting table and a machine tool base of FIG. 1, the machine tool being removed in order to show details of the locking mechanism.
Figure 5:
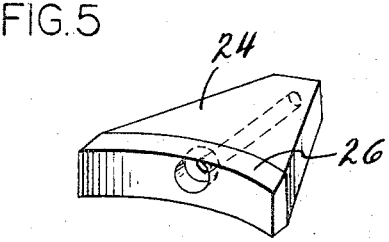
FIG. 5 is an up-side-down perspective view of one of the locking wedges used in my locking mechanism.

On the accompanying drawing I have used the reference numeral 10 to indicate a supporting table for a machine tool which may be mounted on a housing or stand 12 in the usual manner. A machine tool base 14 is positioned on the top surface of the table 10 and is adapted to support a machine tool shown in general at 34 having a milling cutter, saw blade or Carborundum wheel or the like 36 adapted to cut a workpiece held in a suitable vise or the like 38.

The machine tool base 14 is rotatably adjustable on the table 10 so that the tool element 36 may be fed through the workpiece at right angles to its axis or at any desired angle relative thereto. Heretofore, locking means have been provided for locking the machine tool base against rotation but the parts had to be quite accurately fitted in order to prevent any undesirable vibration and inaccuracy of cut caused by looseness as between the top surface of the table 10 and the bottom surface of the base 14.

Figure 3:
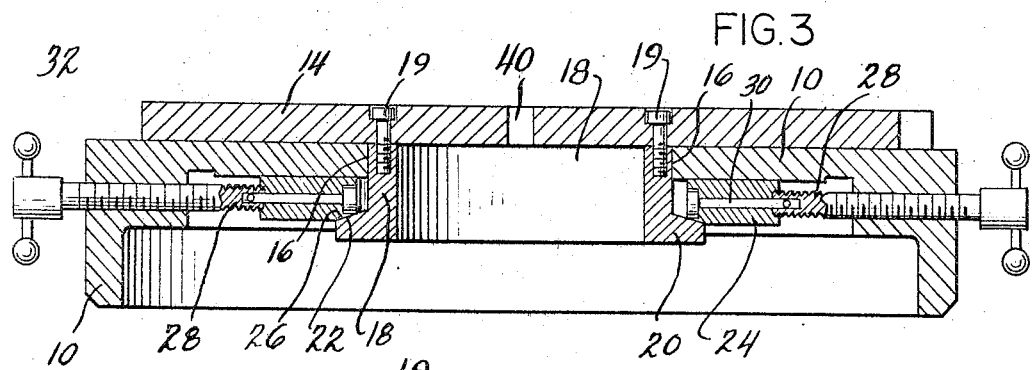
FIG. 3 is an enlarged sectional view on the line 3—3 of FIG. 2, showing the locking means in operable position.

I provide a novel locking means which overcomes this trouble by tending to draw the bottom surface of the base 14 into intimate contact with the top surface of the table 10 when the lock means is operable. My mechanism comprises a cylindrical element 18 projecting downwardly from the lower surface of the base 14 and secured thereto as by cap screws or the like 19. The cylindrical member 18 has a peripheral flange 20 provided with a cone-shaped upper surface 22. For coaction with the surface 22 lock elements 24 are provided which have similar cone-shaped or inclined surfaces 26 adapted to mate with the surfaces 22 in the locked position of the parts as shown in FIG. 3.

Figure 4:
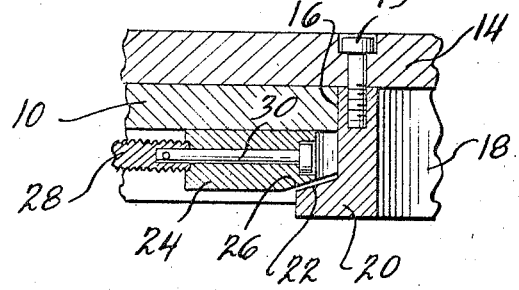
FIG. 4 is a further enlargement of a portion of FIG. 3, showing the locking means released.

For effecting the locking and unlocking of the lock elements 24 I provide a screw-threaded rod 28 for supporting each, a headed rod 30 being associated with the parts 24 and 28 as best shown in FIG. 4 to swively mount the elements 24 on the rods 28. The rods themselves are threaded through edges of the table 10 and project therefrom, and are provided with hand grip wheels or handles 32 on their outer ends for manual operation of the locking elements.

When the locking elements are unlocked, as in FIG. 4 there is a space between the surfaces 22 and 26, and the base 14 is free to be rotated to any desired position. Thereupon the lock elements may be forced inwardly by the screw-threaded rods 28 as shown in FIG. 3 and wedged between the bottom surface of the table 10 and the cone-shaped surface 22 of the flange 20 to provide a downward component of force of considerable leverage for tightly engaging the machine tool base with the table top 10. Thus with the single locking action, both locking against rotation and rigid contact of the machine tool base and the table are assured.

Some changes may be made in the construction and arrangement of the parts of my machine tool table locking mechanism without departing from the real spirit and purpose of my invention, and it is my intention to cover by my claims any modified forms of structure or use of mechanical equivalents which may reasonably be included within their scope.

I claim as my invention:

1. Locking mechanism for a machine tool comprising a supporting table having a circular opening therethrough, a machine tool base rotatable on the top surface of said table and having a cylindrical portion depending therefrom and rotatable in said opening, a flange projecting outwardly from the periphery of said cylindrical portion and spaced below the bottom surface of said table surrounding said opening therein, said flange having an upper cone-shaped surface, lock means positioned between said bottom surface and said cone-shaped surface of said flange and having a locking surface inclined to fit said cone-shaped surface, and means for sliding said lock means along said bottom surface to engage said locking surface with said cone-shaped surface and said tool base with said top surface of said table to thereby lock said machine tool base against rotation and draw it into intimate contact with the top surface of said table.

2. Locking mechanism for a machine tool according to claim 1 wherein said lock means comprises a plurality of wedge elements spaced around the circumference of said cylindrical portion.

3. Locking mechanism for a machine tool according to claim 1 wherein threaded rod means are provided for supporting said wedge element, a non-threaded extension on the inner end thereof, said wedge element being swivelly mounted on said non-threaded extension, said threaded rod means being threadedly supported by said table with its outer end projecting from the edge thereof, and hand grip means on the projecting portion thereof.

References Cited

UNITED STATES PATENTS 1,858,898  5/1932  Mesker _____ 29—1.5
2,686,449  8/1954  Parsons _____ 29—1.5

RICHARD H. EANES, JR., *Primary Examiner.*

U.S. Cl. X.R.

90—58